United States Patent
Tateishi

(10) Patent No.: US 7,257,056 B2
(45) Date of Patent: Aug. 14, 2007

(54) OPTICAL PICKUP TRACKING CONTROLLER AND OPTICAL PICKUP TRACKING CONTROL METHOD

(75) Inventor: Kiyoshi Tateishi, Saitama (JP)

(73) Assignee: Pioneer Corporation, Tokyo (JP)

(*) Notice: Subject to any disclaimer, the term of this patent is extended or adjusted under 35 U.S.C. 154(b) by 83 days.

(21) Appl. No.: 10/872,412

(22) Filed: Jun. 22, 2004

(65) Prior Publication Data

US 2004/0228231 A1    Nov. 18, 2004

Related U.S. Application Data

(62) Division of application No. 09/534,195, filed on Mar. 24, 2000, now Pat. No. 6,775,210.

(30) Foreign Application Priority Data

Mar. 24, 1999  (JP)  ............... 11-078810

(51) Int. Cl.
G11B 7/09    (2006.01)

(52) U.S. Cl. ............... 369/44.41; 369/53.23

(58) Field of Classification Search ............ None
See application file for complete search history.

(56) References Cited

U.S. PATENT DOCUMENTS 4,740,940 A    4/1988 Tanaka et al.
5,038,333 A    8/1991 Chow et al.
5,060,216 A    10/1991 Suzuki et al.
5,808,979 A    9/1998 Ishibashi et al.
5,945,849 A    8/1999 Yamamoto
6,205,094 B1   3/2001 van Zalinge
6,262,954 B1   7/2001 Watabe
6,285,635 B1   9/2001 Watanabe
6,317,396 B1   11/2001 Kuribayashi
6,388,946 B1   5/2002 McGibney
6,775,210 B1*  8/2004 Tateishi ............... 369/44.41

FOREIGN PATENT DOCUMENTS

JP    59153320 A    9/1984

* cited by examiner

Primary Examiner—Andrea Wellington
Assistant Examiner—Michael V. Battaglia
(74) Attorney, Agent, or Firm—Sughrue Mion, PLLC

(57) ABSTRACT

In a tracking controller for an optical pickup, a photodetector having four light reception parts receives return light from an optical disc and outputs light detection electric signals. Predetermined addition and subtraction operations are performed on the light detection electric signals from the light reception parts. A phase comparator compares phases and outputs a pseudo radial contrast signal. Bringing into tracking servo control is performed based on the pseudo radial contrast signal.

4 Claims, 9 Drawing Sheets

OPTICAL PICKUP TRACKING CONTROLLER AND OPTICAL PICKUP TRACKING CONTROL METHOD

This is a divisional of application Ser. No. 09/534,195 filed Mar. 24, 2000 now U.S. Pat. No. 6,775,210; the disclosure of which is incorporated herein by reference.

BACKGROUND OF THE INVENTION

1. Field of the Invention

This invention relates to an optical pickup tracking controller and an optical pickup tracking control method for positioning emission light on an information record track of an optical disc in an optical pickup for reading information from the optical disc based on return light from the optical disc.

2. Description of the Related Art

An optical pickup comprising a light source, a light transfer optical system, and a light detection system is used to read optical disc record information of music, data, etc., from return light provided by applying emission light from the light source to the information record side of the surface of an optical disc such as a CD (compact disc) or a CD-ROM (compact disc-read-only memory) and reflecting the applied light on the information record side of the optical disc.

To reliably read the information from the optical disc in the optical pickup, it is necessary to control so as to always apply emission light onto a record location on the information record side of the optical disc, such as an information record track, namely, it is necessary to perform tracking servo control.

A tracking servo control technique, for example, as shown in FIGS. 9(A) to 9(D) is known.

FIG. 9(D) is a sectional view of an optical disc wherein the surface of the optical disc is cut in the radial direction of the disc. A projection portion P is called a pit and a flat portion L is called a land. With the pit P, an information write state is shown and is read. If the optical pickup is moved in the radial direction of the disc (right and left in FIGS. 9(A) to 9(D)), emission light from the optical pickup moves so as to cross a pit string comprising pits P arranged in the tangential direction.

At this time, a reproduction (playback) RF signal from a photodetector receiving return light becomes as shown in FIG. 9(A). If the reproduction (playback) RF signal is made to pass through a low-pass filter (LPF) or the envelope of the signal is taken, a radial contrast signal RC as shown in FIG. 9(B) is provided. As shown here, the radial contrast signal RC has the center of the crest of the waveform matching the center position of the pit P and the center of the trough of the waveform matching the center position of the land L.

Light from the photodetector receiving return light is detected and is converted into an electric signal, whereby a signal TE as shown in FIG. 9(C) can be provided. The signal TE has a waveform passing through a zero level B (crossing zero) at the point corresponding to the center position of the land L as shown in the part of A.

Therefore, to perform tracking servo control, it is necessary to control the optical pickup so as to become the center of the trough of the radial contrast signal RC. This operation is called "bringing into tracking servo control". In fact, tracking servo control is performed by performing feedback position control based on the TE signal so that the signal TE crosses zero as TE crosses zero at the center of the trough of RC. Although TE also crosses zero at the center of the crest of RC, the polarity of the differential value of TE is opposite at the position and if an attempt is made to perform feedback control, oscillation occurs. Therefore, it is necessary to perform feedback control based on TE at the center of the trough of RC; it is important to detect RC.

However, as optical discs with information recorded at a high density, such as a DVD (digital versatile disc), have been used in recent years, the following problem arises in the tracking servo control of the optical pickup in the related art described above:

As information is recorded on a disc at a higher density, the spacing between pits, namely, track pitch (the distance between the center positions in FIG. 9(D)) becomes narrower. Thus, the asperities of the waveform of the radial contrast signal RC become very small, the S/N ratio of the signal lowers, and the position of each trough of the radial contrast signal RC may be detected erroneously. If the position of the trough of the radial contrast signal RC is detected erroneously, bringing into tracking servo control is performed at the erroneous position and tracking control becomes unstable.

SUMMARY OF THE INVENTION

It is therefore an object of the invention to provide an optical pickup tracking controller and an optical pickup tracking control method for making it possible to bring into tracking servo control stably even if the track pitch of an optical disc is narrow.

In order to achieve the above object, according to the invention, there is provided, in an optical pickup for reading optical disc record information from return light provided by reflecting emission light from a light source on an information record track, an optical pickup tracking controller for performing tracking servo control so as to position the emission light on the information record track, the optical pickup tracking controller comprising: a photodetector having n light reception parts where n is an integer of two or more for receiving the return light and outputting light detection electric signals; signal processing means for performing predetermined operations on the light detection electric signals from the light reception parts, comparing phases, and outputting a signal for bringing into tracking control; and tracking control means for bringing into the tracking servo control based on the signal for bringing into tracking control.

Further, according to the invention, there is provided, in an optical pickup for writing optical disc record information onto an information record track of an optical disc based on emission light from a light source or reading the optical disc record information from return light provided by reflecting emission light from the light source on the information record track, an optical pickup tracking control method for performing tracking servo control so as to position the emission light on the information record track, the optical pickup tracking control method comprising the steps of: receiving the return light by a photodetector having n light reception parts where n is an integer of two or more and outputting light detection electric signals; performing predetermined operations on the light detection electric signals from the light reception parts, comparing phases, and outputting a signal for bringing into tracking control by signal processing means; and bringing into the tracking servo control based on the signal for bringing into tracking control by tracking control means.

DETAILED DESCRIPTION OF THE PREFERRED EMBODIMENTS

Referring now to the accompanying drawings, there are shown preferred embodiments of the optical pickup tracking controller according to the invention.

(1) First Embodiment

Figure 1:
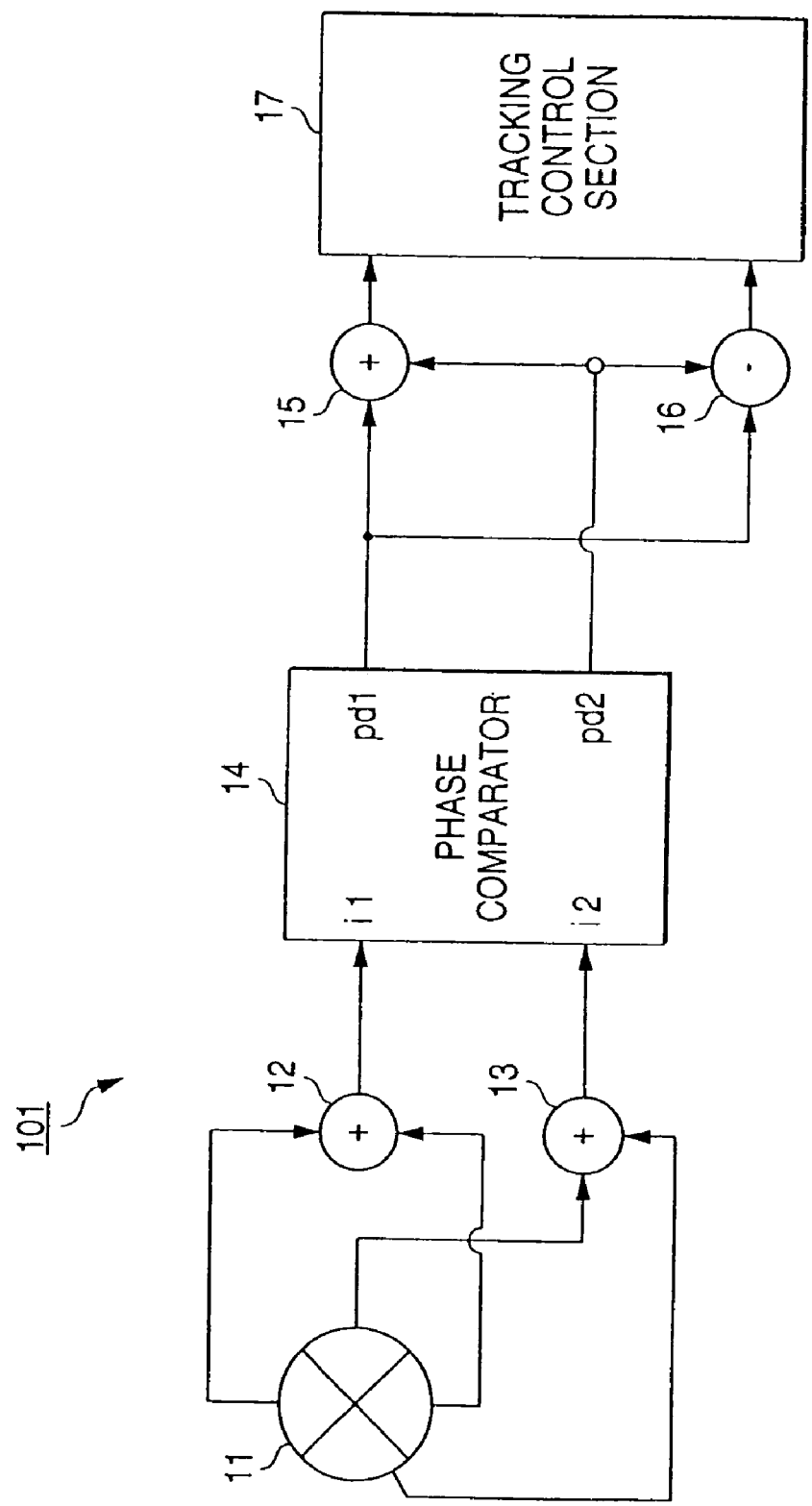
FIG. 1 is a diagram to show the configuration of an optical pickup tracking controller of a first embodiment of the invention.

FIG. 1 is a diagram to show the configuration of an optical pickup tracking controller of a first embodiment of the invention. As shown in FIG. 1, an optical pickup tracking controller 101 comprises a photodetector 11 for receiving return light provided by reflecting emission light from a light source such as a semiconductor laser (not shown) on an information record track of an optical disc, adders 12 and 13, a phase comparator 14, an adder 15, a subtractor 16, and a tracking control section 17.

The photodetector 11 has four light reception parts for receiving return light from an optical disc and outputting light detection electric signals.

The adder 12 calculates the sum of the light detection electric signals of the two light reception parts of the photodetector 11 at diagonal positions to generate a diagonal sum signal and outputs the diagonal sum signal to an i1 terminal of the phase comparator 14. The adder 13 calculates the sum of the light detection electric signals of other two light reception parts of the photodetector 11 at different diagonal positions to generate a diagonal sum signal and outputs the diagonal sum signal to an i2 terminal of the phase comparator 14. The adders 12 and 13 correspond to diagonal sum generation means.

Figure 2:
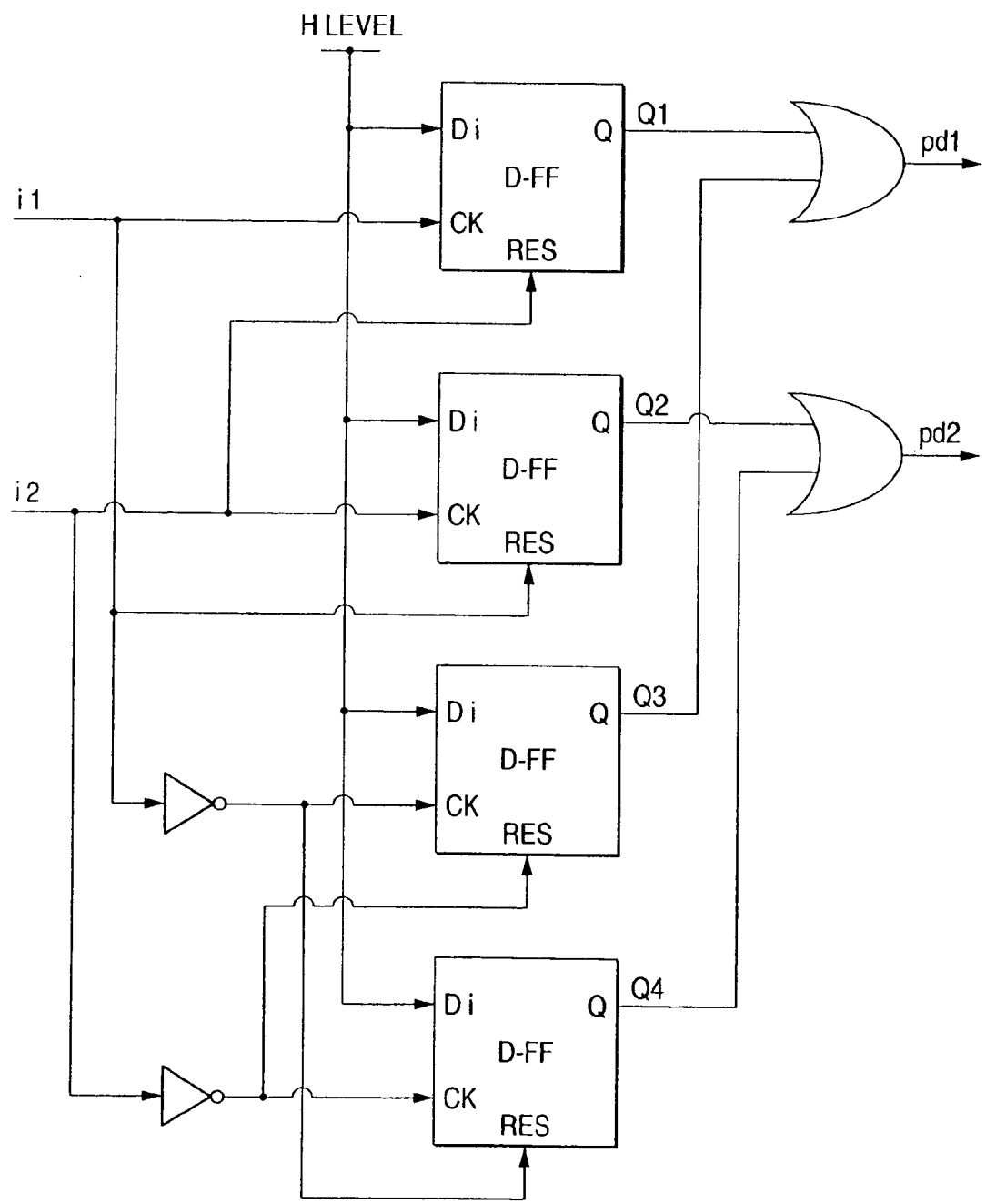
FIG. 2 is a diagram to show the configuration of an example of a phase comparator in the optical pickup tracking controller of the first embodiment of the invention.
Figure 3:
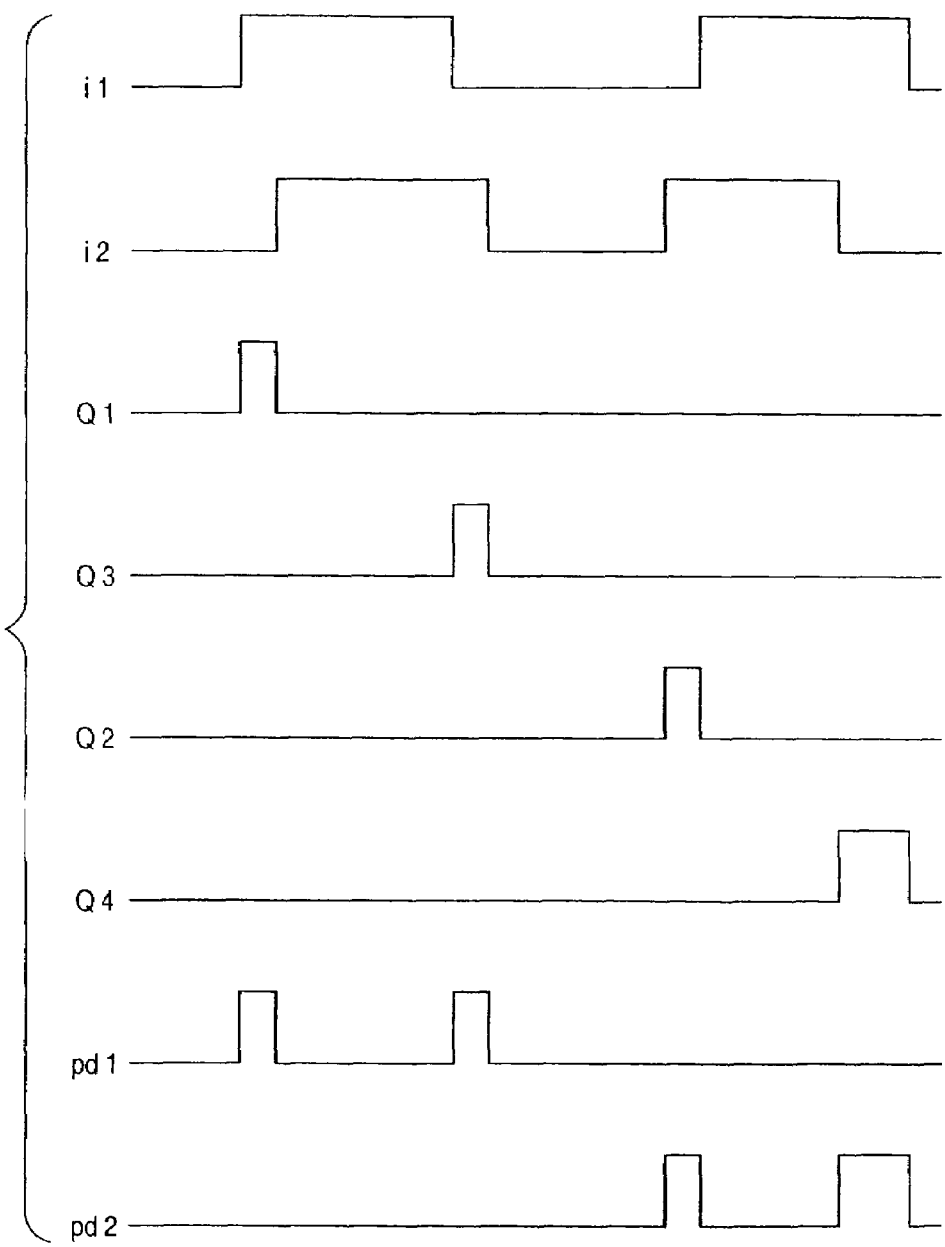
FIG. 3 is a timing chart to describe an example of signal processing in the phase comparator in the first embodiment of the invention.

FIG. 2 shows the configuration of an example of the phase comparator 14. FIG. 3 is a timing chart to describe an example of signal processing in the phase comparator 14. The phase comparator 14 compares the phases of the diagonal sum signals input to the input terminals i1 and i2. As shown in FIG. 3, if the phase of i1 leads, the phase comparator 14 outputs a first phase lead signal from a pd1 terminal and if the phase of i1 lags, the phase comparator 14 outputs a first phase lag signal from a pd2 terminal. The phase comparator 14 corresponds to first phase comparison means.

The adder 15 calculates the sum of the first phase lead signal output from the output terminal pd1 of the phase comparator 14 and the first phase lag signal output from the output terminal pd2 of the phase comparator 14 and outputs the sum to the tracking control section 17 as a signal PHSUM. The adder 15 corresponds to first phase sum generation means.

The subtractor 16 calculates the difference between the first phase lead signal output from the output terminal pd1 of the phase comparator 14 and the first phase lag signal output from the output terminal pd2 of the phase comparator 14 and outputs the difference to the tracking control section 17 as a phase comparison signal (DPD (differential phase detection) signal). The subtractor 16 corresponds to first phase difference generation means.

Figure 4:
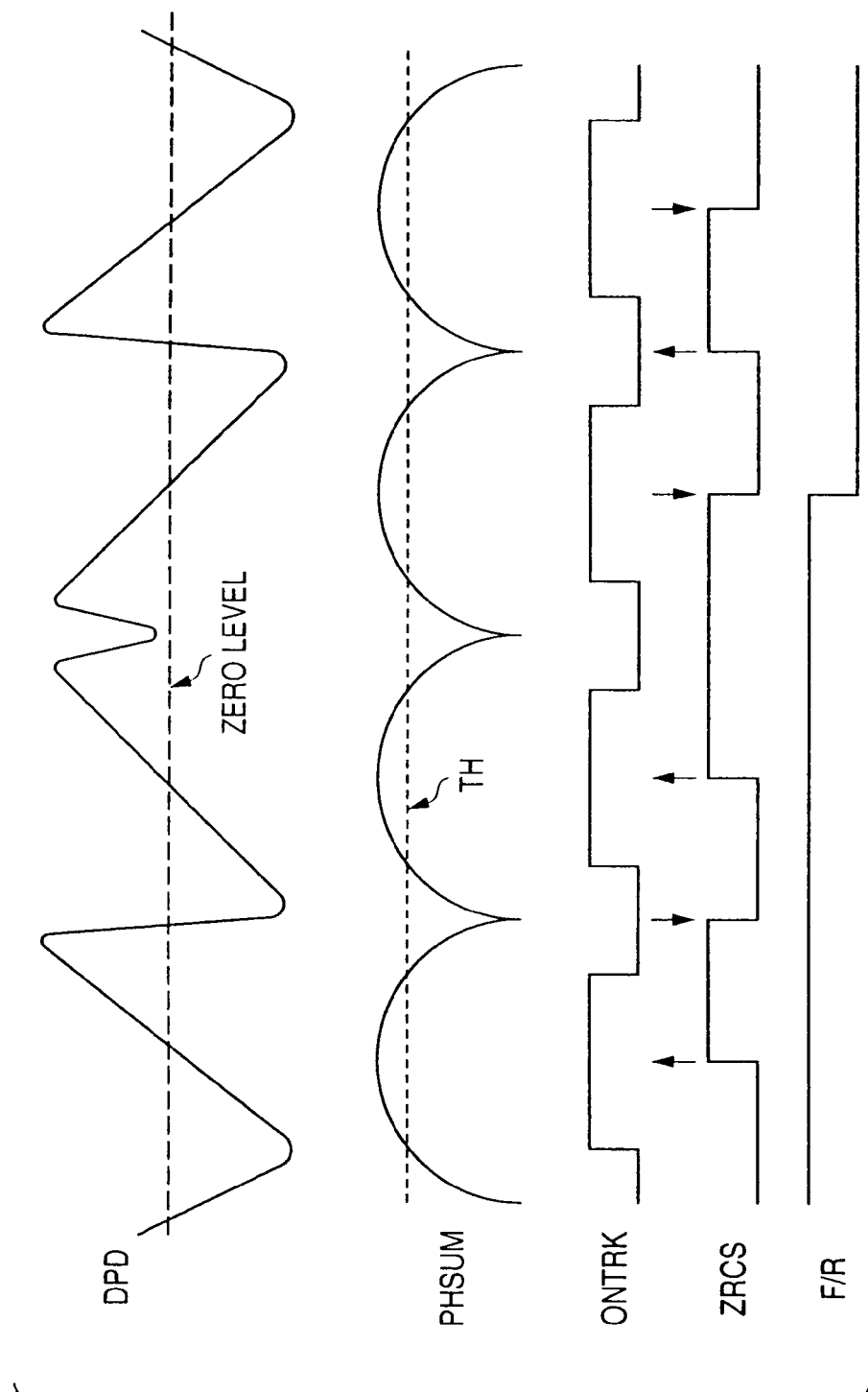
FIG. 4 is a timing chart to describe signal processing in a tracking control section in the first embodiment of the invention.
Figure 9:
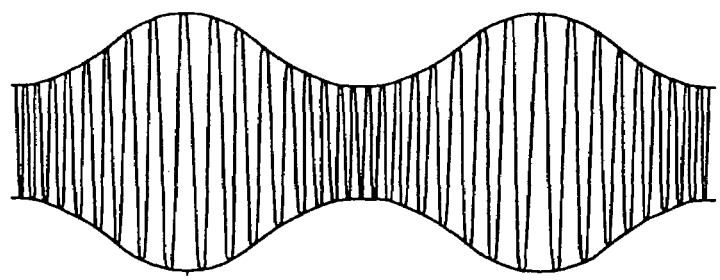
FIGS. 9(A) to 9(D) are charts to describe problems in tracking servo control of a conventional optical pickup.
Figure 9:
Figure 9:
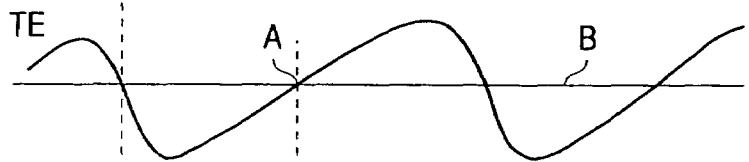
Figure 9:
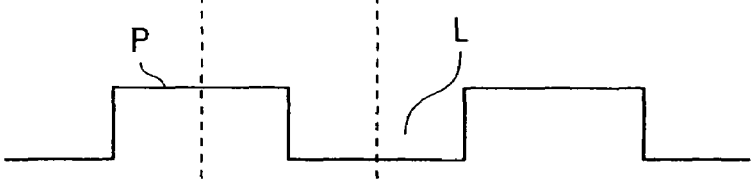

FIG. 4 is a timing chart to describe signal processing in the tracking control section 17. The top stage of FIG. 4 shows the phase comparison signal DPD output from the subtractor 16 to the tracking control section 17. The phase comparison signal DPD is a signal having a similar nature to that of signal TE shown in FIG. 9(C), and the zero-crossing point of the phase comparison signal DPD is the center position of an information record track of the optical disc.

The second top stage of FIG. 4 shows the signal PHSUM output from the adder 15 to the tracking control section 17. The signal PHSUM is a signal having a similar nature to that of radial contrast signal RC shown in FIG. 9(B), and the center position of the crest of the waveform of the signal PHSUM is the center position of an information record track of the optical disc. Hereinafter, the signal PHSUM will be referred to as a pseudo radial contrast signal. The pseudo radial contrast signal PHSUM corresponds to a signal for bringing into tracking control.

Therefore, the pseudo radial contrast-signal PHSUM is compared with an appropriate slice level TH as shown in FIG. 4, whereby a signal ONTRK as shown at the third top stage of FIG. 4 can be provided. Hereinafter, the signal ONTRK will be referred to as an on track signal.

The on track signal ONTRK has the center position of a crest-like waveform (between rising and falling edges) matching the center position of an information record track of the optical disc, which will be hereinafter referred to as an on track position. The on track signal ONTRK has the center position of a trough-like waveform (between falling and rising edges) matching the middle position between information record tracks of the optical disc, which will be hereinafter referred to as an off track position.

A signal ZRCS at the fourth top stage of FIG. 4 indicates the direction in which the phase comparison signal DPD at the top stage crosses the zero level. That is, when the phase comparison signal DPD crosses zero from the negative side to the positive side, the signal ZRCS rises and when the phase comparison signal DPD crosses zero from the positive side to the negative side, the signal ZRCS falls. Hereinafter, the signal ZRCS will be referred to as a zero-cross signal.

When emission light from the optical pickup moves on information record tracks in the radial direction of the disc, a signal F/R at the bottom stage of FIG. 4 indicates which direction the emission light is directed relatively. The signal F/R is provided by latching the on track signal ONTRK on the rising edge of the zero-cross signal ZRCS and the falling edge thereof. Hereinafter, the signal F/R will be referred to as a direction detection signal.

Figure 5:
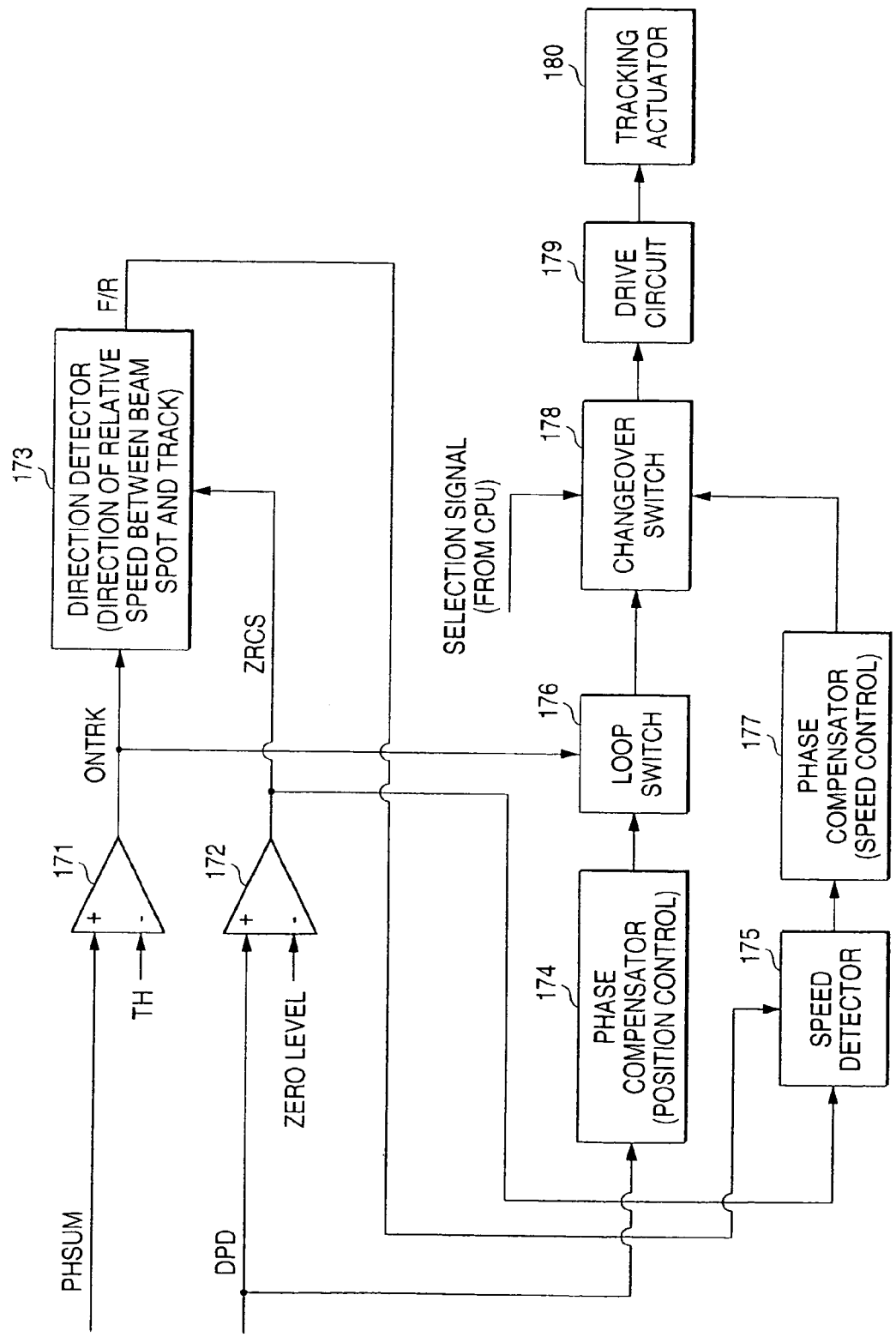
FIG. 5 is a diagram to show the configuration of an example of the tracking control section in the first embodiment of the invention.

FIG. 5 is a diagram to show the configuration of an example of the tracking control section 17. As shown in FIG. 5, the tracking control section 17, which has a comparator 171, compares the pseudo radial contrast signal PHSUM with the slice level TH, thereby generating the on track signal ONTRK, and outputs the on track signal ONTRK to the direction detector 173.

The tracking control section 17, which has a comparator 172, compares the phase comparison signal DPD at the zero level, thereby generating the zero-cross signal ZRCS, and outputs the zero-cross signal ZRCS to the direction detector 173.

Figure 6:
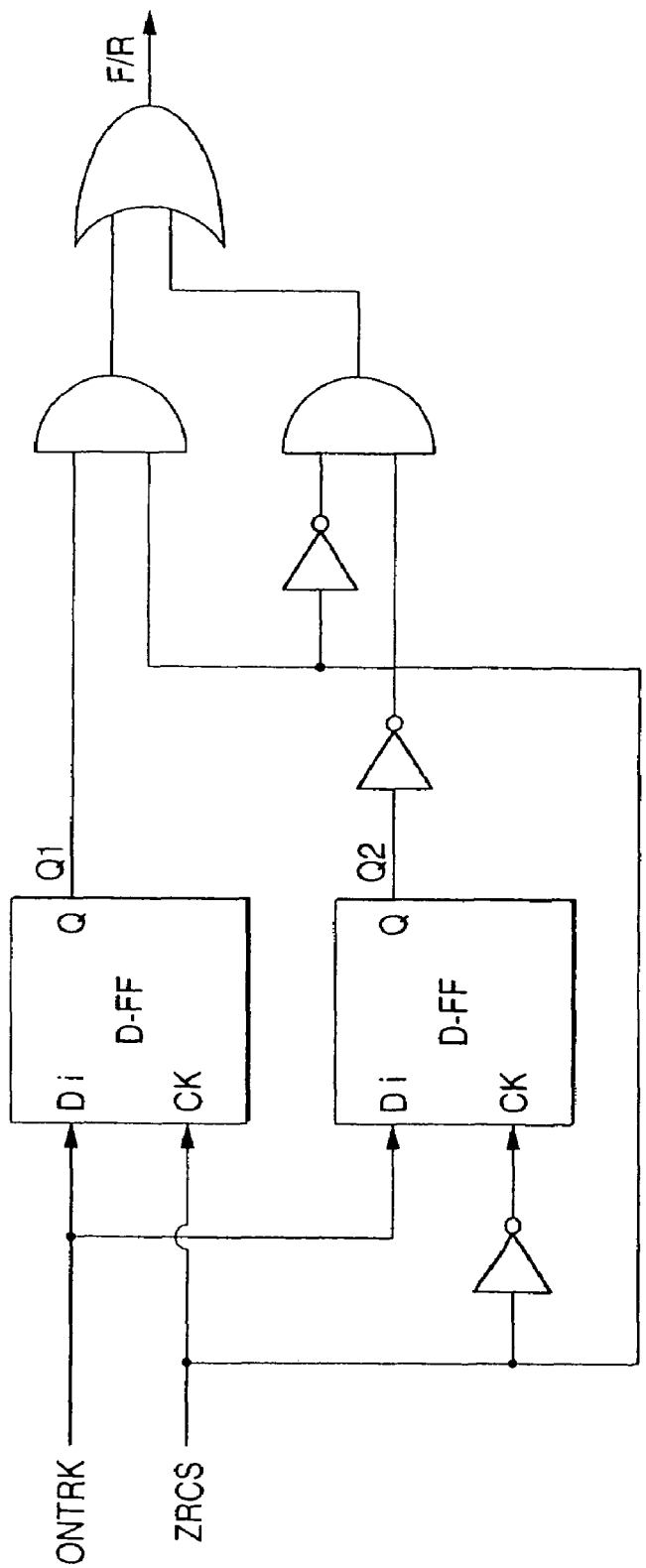
FIG. 6 is a diagram to show the configuration of an example of a direction detector shown in FIG. 5.
Figure 7:
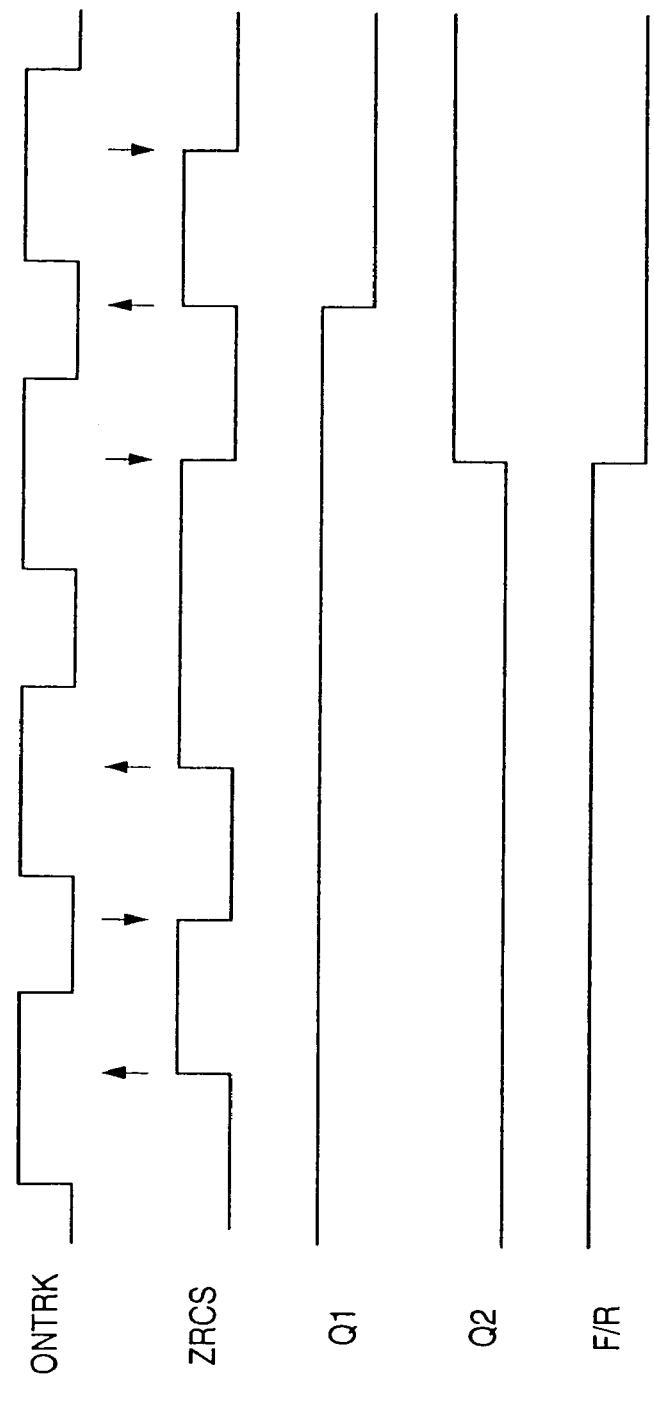
FIG. 7 is a timing chart to describe signal processing in the example of the direction detector shown in FIG. 5.

FIG. 6 is a diagram to show the configuration of an example of the direction detector 173 shown in FIG. 5. FIG. 7 is a timing chart to describe signal processing in the example of the direction detector 173 shown in FIG. 5.

The direction detector 173 latches the on track signal ONTRK on the rising edge of the zero-cross signal ZRCS and the falling edge thereof, thereby generating the direction detection signal F/R. The direction detection signal F/R is output to a speed detector 175 and is transferred through a phase compensator 177, a changeover switch 178, and a drive circuit 179 to a tracking actuator 180, thereby driving the tracking actuator 180. The tracking actuator 180 moves the optical pickup and controls the disc radial position of emission light of the optical pickup. Thus, the emission light of the optical pickup is moved onto a target information record track and bringing into tracking servo control can be performed.

Then, the phase comparison signal DPD is transferred through a phase compensator 174, a loop switch 176, the changeover switch 178, and the drive circuit 179 to the tracking actuator 180, thereby driving the tracking actuator 180. The tracking actuator 180 controls the position of the optical pickup so that the emission light of the optical pickup does not deviate from the on track position of the information record track. Thus, tracking servo control of the emission light of the optical pickup can be performed.

In the first embodiment described, the adders 12 and 13, the phase comparator 14, and the adder 15 make up signal processing means. The tracking control section 17 corresponds to tracking control means.

According to the optical pickup tracking controller 101 of the first embodiment described above, if information is recorded on an optical disc at a high density and the information record track pitch becomes narrow and the S/N ratio lowers with the radial contrast signal in the related art, the pseudo radial contrast signal generated by the new method always enables bringing into track servo control at the correct position, so that stable tracking control can be performed.

(2) Second Embodiment

Figure 8:
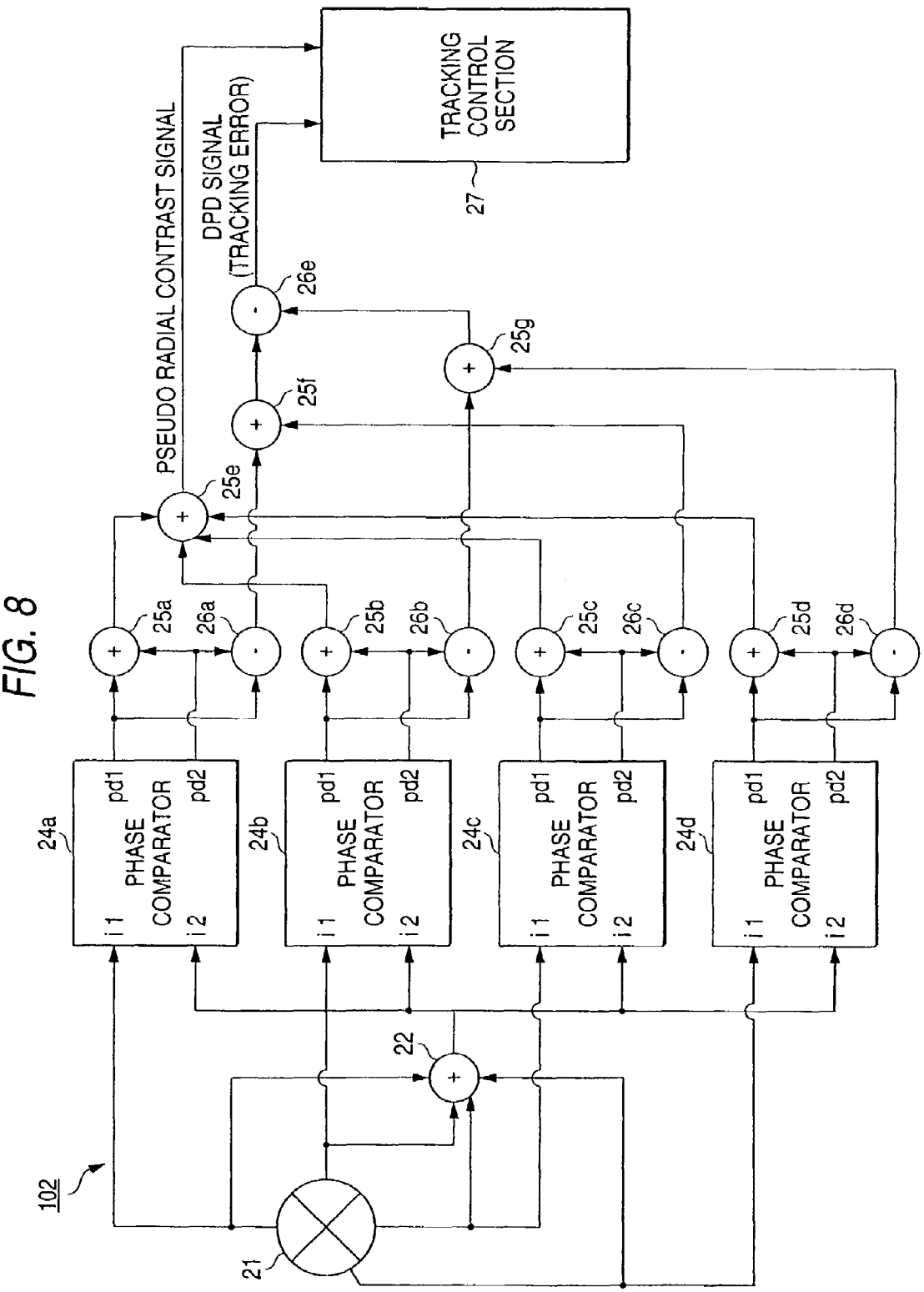
FIG. 8 is a diagram to show the configuration of an optical pickup tracking controller of a second embodiment of the invention.

Next, a second embodiment of the invention will be discussed. FIG. 8 is a diagram to show the configuration of an optical pickup tracking controller of the second embodiment of the invention. As shown in FIG. 8, an optical pickup tracking controller 102 comprises a photodetector 21 for receiving return light provided by reflecting emission light from a light source such as a semiconductor laser (not shown) on an information record track of an optical disc, an adder 22, phase comparators 24a, 24b, 24c, and 24d, adders 25a, 25b, 25c, 25d, 25e, 25f, and 25g, subtractors 26a, 26b, 26c, 26d, and 26e, and a tracking control section 27.

The photodetector 21 has four light reception parts for receiving return light from an optical disc and outputting light detection electric signals. The light detection electric signals of the four light reception parts are output to i1 terminals of the phase comparators 24a, 24b, 24c, and 24d.

The adder 22 calculates the sum of the light detection electric signals of all the four light reception parts of the photodetector 21 to generate a sum signal and outputs the sum signal to i2 terminals of the phase comparators 24a, 24b, 24c, and 24d. The adder 22 corresponds to sum generation means.

The configuration of each of the phase comparators 24a, 24b, 24c, and 24d is similar to that of the phase comparator 14 in the first embodiment. The phase comparator 24a compares the phases of one detector signal and the sum signal input to the input terminals i1 and i2. If the phase of i1 leads, the phase comparator 24a outputs a second phase lead signal from a pd1 terminal and if the phase of i1 lags, the phase comparator 24a outputs a second phase lag signal from a pd2 terminal. Each of the phase comparators 24b, 24c, and 24d also performs similar operation to that of the phase comparator 24a. The phase comparators 24a to 24d correspond to second phase comparison means.

The adder 25a calculates the sum of the second phase lead signal output from the output terminal pd1 of the phase comparator 24a and the second phase lag signal output from the output terminal pd2 of the phase comparator 24a. Each of the adders 25b, 25c, and 25d also performs similar operation to that of the adder 25a. The adder 25e outputs the sum of the outputs of the adders 25a to 25d to the tracking control section 27 as a pseudo radial contrast signal. The adders 25a to 25d and 25e correspond to second phase sum generation means.

The subtractor 26a calculates the difference between the second phase lead signal output from the output terminal pd1 of the phase comparator 24a and the second phase lag signal output from the output terminal pd2 of the phase comparator 24a and outputs the difference to the adder 25f. The subtractor 26c also performs similar operation to that of the subtractor 26a. The subtractor 26b calculates the difference between the second phase lead signal output from the output terminal pd1 of the phase comparator 24b and the second phase lag signal output from the output terminal pd2 of the phase comparator 24b and outputs the difference to the adder 25g. The subtractor 26d also performs similar operation to that of the subtractor 26b. The subtractor 26e performs subtraction on outputs of the adders 25f and 25g and outputs the result to the tracking control section 27 as a phase comparison signal DPD. The subtractor 26e corresponds to second phase difference generation means.

Also in the second embodiment, the pseudo radial contrast signal output from the adder 25e becomes a waveform as shown at the second top stage of FIG. 4, and the tracking control section 27 compares the pseudo radial contrast signal with an appropriate slice level, whereby an on track signal as shown at the third top stage of FIG. 4 can be provided. From the on track signal, a direction detection signal as shown at the bottom stage of FIG. 4 is generated. When emission light from the optical pickup moves on information record tracks in the radial direction of the disc, the direction detection signal indicates which direction the emission light is directed relatively. The direction detection signal enables bringing into tracking servo control.

Then, the tracking control section 27 processes the phase comparison signal DPD output, from the subtractor 26e. That is, the tracking control section 27 controls the position of the optical pickup so that the emission light of the optical pickup does not depart from the on track position of the information record track. Thus, tracking servo control of the emission light of the optical pickup can be performed.

In the second embodiment described, the adder 22, the phase comparators 24a to 24d, and the adders 25a to 25d make up signal processing means. The tracking control section 27 corresponds to tracking control means.

According to the optical pickup tracking controller 102 of the second embodiment described above, even if information is recorded on an optical disc at a high density and the information record track pitch becomes narrow and the S/N ratio lowers with the radial contrast signal in the related art, the pseudo radial contrast signal generated by the new method always enables bringing into track servo control at the correct position, so that stable tracking control can be performed.

The invention is not limited to the embodiments. The embodiments are illustrative and not restrictive, since the scope of the invention is defined by the appended claims, and all changes that fall within meets and bounds of the claims, or equivalents of such meets and bounds are therefore intended to be embraced by the claims.

For example, in the description of the embodiments, the photodetector having four light reception parts is taken as an example of a photodetector, but the invention is not limited to the example; the photodetector may be of any other configuration, for example, may have n light reception parts where n is an integer of two or more.

In the description of the embodiments, addition and subtraction operations are performed on the signals from the photodetector as examples, but the invention is not limited to the examples; in summary, if predetermined operations are performed on the light detection electric signals from the light reception parts of the photodetector and phases are compared and a signal for bringing into tracking control is output, any signal processing may be performed.

As described throughout the specification, according to the invention, the photodetector having n light reception parts where n is an integer of two or more receives return light from an optical disc and outputs light detection electric signals. Then, predetermined operations are performed on the light detection electric signals from the light reception parts, phases are compared, a signal for bringing into tracking control is output, and bringing into tracking servo control is performed based on the signal for bringing into tracking control. Thus, if information is recorded on an optical disc at a high density and the information record track pitch becomes narrow, bringing into track servo control can always be performed at the correct position, so that stable tracking control can be performed.

What is claimed is:

1. An optical pickup tracking controller comprising:
   sum generation means for generating a sum signal of light detection electric signals of a plurality of light reception parts;
   phase comparison means for comparing phases of the sum signal and each of the light detection electric signals to obtain a plurality of comparison results respectively corresponding to the light detection electric signals and outputting, based on the comparison results, a plurality of phase lead signals, which respectively correspond to the light detection electric signals, and a plurality of phase lag signals, which respectively correspond to the light detection electric signals;
   phase sum generation means for calculating sums based on the phase lead signals and the phase lag signals and outputting a tracking control signal based on the sums; and
   phase difference generation means for calculating phase difference signals of differences between the phase lead signals and the phase lag signals wherein the optical pickup tracking controller performs tracking servo control based on the phase difference signals.

2. In an optical pickup for reading optical disc record information from return light provided by reflecting emission light from a light source on an information record track, an optical pickup tracking controller for performing tracking servo control so as to position the emission light on the information record track, said optical pickup tracking controller comprising:
   a photodetector having n light reception parts where n is an integer of two or more for receiving the return light and outputting light detection electric signals;
   signal processing means for performing predetermined operations on the light detection electric signals from the light reception parts, comparing phases, and outputting a signal for bringing into tracking control;
   tracking control means for bringing into the tracking servo control based on the signal for bringing into tracking control,
   wherein said signal processing means comprises:
      sum generation means for generating a sum signal of the light detection electric signals of the light reception parts;
      second phase comparison means for comparing phases of the sum signal and each of the light detection electric signals to obtain a plurality of comparison results respectively corresponding to the light detection electric signals and outputting, based on the comparison results, a plurality of second phase lead signals, which respectively correspond to the light detection electric signals, and a plurality of second phase lag signals, which respectively correspond to the light detection electric signals; and
      second phase sum generation means for calculating sums based on the second phase lead signals and the second phase lag signals and outputting, based on the sums, a signal for bringing into tracking control; and
   second phase difference generation means for calculating second phase difference signals of differences between the second phase lead signals and the second phase lag signals, wherein said tracking control means performs the tracking servo control by a phase comparison method based on the second phase difference signals.

3. An optical pickup tracking controller comprising:
   a first adding circuit that adds light detection electric signals of a plurality of light reception parts to generate a sum signal;
   a phase comparison circuit that compares phases of the sum signal and each of the light detection electric signals to obtain a plurality of comparison results respectively corresponding to the light detection electric signals and that outputs, based on the comparison results, a plurality of phase lead signals, which respectively correspond to the light detection electric signals, and a plurality of phase lag signals, which respectively correspond to the light detection electric signals;
   a second adding circuit that adds the phase lead signals and the phase lag signals to generate a tracking control signal; and
   a phase difference generation circuit that calculates phase difference signals based on differences between the phase lead signals and the phase lag signals,
   wherein the optical pickup tracking controller uses the phase difference signals to perform tracking servo control.

4. A tracking controller, comprising:
a first adding circuit that adds a plurality of detection signals, which are respectively output from a plurality of light receptors, to produce a first sum signal;
a first comparison circuit that compares phases of the first sum signal and a first detection signal of the plurality of detection signals to produce a first comparison result and that outputs a first phase lead signal and a first phase lag signal based on the first comparison result;
a second comparison circuit that compares phases of the first sum signal and a second detection signal of the plurality of detection signals to produce a second comparison result and that outputs a second phase lead signal and a second phase lag signal based on the second comparison result;
a second adding circuit that adds the first phase lead signal and the first phase lag signal to produce a first phase sum signal, that adds the second phase lead signal and the second phase lag signal to produce a second phase sum signal, and that generates a tracking control signal based on the first phase sum signal and the second phase sum signal; and
a phase difference generation circuit that calculates a first phase difference signal based on a difference between the first phase lead signal and the first phase lag signal, that calculates a second phase difference signal based on a difference between the second phase lead signal and the second phase lag signal,
wherein the tracking controller performs tracking servo control based on the first phase difference signal and the second phase difference signal.

* * * * *